US007937104B2

(12) United States Patent
Lintula et al.

(10) Patent No.: US 7,937,104 B2
(45) Date of Patent: May 3, 2011

(54) ARRANGING DATA TRANSFER FOR MOBILE MINE DEVICE

(75) Inventors: Teemu Lintula, Nokia (FI); Riku Pulli, Tampere (FI); Jani Tamminen, Espoo (FI)

(73) Assignee: Sandvik Mining and Construction Oy, Tampere (FI)

( * ) Notice: Subject to any disclaimer, the term of this patent is extended or adjusted under 35 U.S.C. 154(b) by 971 days.

(21) Appl. No.: 11/665,927

(22) PCT Filed: Oct. 21, 2005

(86) PCT No.: PCT/FI2005/050367
§ 371 (c)(1), (2), (4) Date: Apr. 20, 2007

(87) PCT Pub. No.: WO2006/042911
PCT Pub. Date: Apr. 27, 2006

(65) Prior Publication Data

US 2009/0069044 A1 Mar. 12, 2009

(30) Foreign Application Priority Data

Oct. 22, 2004 (FI) ..................................... 20045398

(51) Int. Cl.
*H04B 7/00* (2006.01)

(52) U.S. Cl. ....... 455/525; 455/66.1; 455/99; 455/67.11

(58) Field of Classification Search .................. 455/525, 455/66.1, 67.11, 552.1, 556.1, 115.1, 151.1, 455/152.1, 163.1, 166.2, 183.2, 41.1, 345, 562.1, 351, 454, 37; 370/329, 401, 432
See application file for complete search history.

(56) References Cited

U.S. PATENT DOCUMENTS

| | | | | |
|---|---|---|---|---|
| 5,416,906 | A * | 5/1995 | Mariani | 700/248 |
| 5,956,250 | A * | 9/1999 | Gudat et al. | 701/26 |
| 7,553,211 | B1 * | 6/2009 | DeAngelis | 446/454 |
| 2002/0032780 | A1 * | 3/2002 | Moore et al. | 709/228 |
| 2003/0007467 | A1 * | 1/2003 | Sawada et al. | 370/329 |
| 2004/0133640 | A1 * | 7/2004 | Yeager et al. | 709/204 |
| 2005/0002354 | A1 * | 1/2005 | Kelly et al. | 370/329 |
| 2005/0088318 | A1 * | 4/2005 | Liu et al. | 340/902 |
| 2005/0208924 | A1 * | 9/2005 | Ohaku et al. | 455/345 |
| 2006/0277187 | A1 * | 12/2006 | Roese et al. | 707/9 |

FOREIGN PATENT DOCUMENTS

| | | |
|---|---|---|
| JP | 2005/117112 | 4/2005 |
| WO | 95/22246 | 8/1995 |
| WO | 95/33346 | 12/1995 |
| WO | 99/01943 | 1/1999 |

* cited by examiner

*Primary Examiner* — Tan Trinh

(74) *Attorney, Agent, or Firm* — Drinker Biddle & Reath LLP

(57) ABSTRACT

The invention relates to a method of arranging data transfer between a moving mine vehicle and a control point. At least two wireless connections are established for the mine device, the connections being arranged via different base stations. Substantially the same data are transmitted using at least the two connections. The data that have already been received via another connection are rejected.

17 Claims, 3 Drawing Sheets

ARRANGING DATA TRANSFER FOR MOBILE MINE DEVICE

FIELD OF THE INVENTION

The invention relates to arranging data transfer for a mobile mine device and more particularly to providing redundancy for data transfer.

BACKGROUND OF THE INVENTION

Modern mining technology involves automatic and remote-controlled machines, which can be controlled and monitored from control rooms located below or above the ground. Remote-controlled machines include mainly various drilling, loading and transportation machines. In particular, remote-controlling improves the working environment of the personnel. The remote-controlling and other kind of data transfer require a remote-control system for transferring data between machines and control rooms.

Machines have typically been controlled over a wireless connection. The path of the remote-controlled machine is provided with a sufficient number of base stations so that information, for example control data to the machine and video data to the control station, can be transferred continuously between the machine and the control room. The machine comprises a terminal at least for receiving a radio signal, and typically also for transmitting one. To maintain the data transfer connection, the base station responsible for data transmission, i.e. serving the machine, has to be changed as the machine proceeds.

A wireless connection has usually been implemented utilizing proprietary data transfer methods. A prior art radio interface of a system employs the spread spectrum technique, which provides a data transfer link for transferring data, video and audio signals combined into one digital bit stream.

The use of generally standardized data transfer techniques in the remote control of machines has also been contemplated. For example, the WLAN technique (Wireless Local Area Network) standardized by the IEEE, in particular IEEE 802.11 based techniques have been proposed for this purpose. A problem associated with WLAN techniques as well as with some other wireless packet-switched data transfer techniques is how to provide a sufficiently reliable data transfer connection so that data transfer delays remain sufficiently small for reliable remote controlling.

BRIEF DESCRIPTION OF THE INVENTION

The object of the invention is to provide an improved solution for arranging data transfer for mobile mine devices. The object of the invention is achieved by a method, a system, a telecommunications unit, a mine device, a network element, and a computer program which are characterized by what is disclosed in the independent claims. Preferred embodiments are described in the dependent claims.

According to an aspect of the invention, at least two wireless connections are established for a mobile mine device, the connections being arranged via different base stations. Substantially the same data are transmitted employing at least the two connections. Data already received over one of the connections are rejected.

An advantage of the arrangement according to the invention is that it improves the reliability of data transfer significantly since at least two connections are used for transferring substantially the same data. If a base station handover is performed on the first connection, the data are available via the second connection. Thus data transfer delays can be reduced compared to the use of a single connection, particularly in connection with a base station handover. This is highly advantageous in remote control systems for mine vehicles according to an embodiment where a small data transfer delay is of particular significance.

According to a preferred embodiment of the invention, data are tunneled over at least two different wireless connections. An advantage of the use of tunneling is that it is transparent to lower layers, for example to the wireless network.

BRIEF DESCRIPTION OF THE FIGURES

The invention will now be described in greater detail by preferred embodiments with reference to the accompanying drawings, where.

DETAILED DESCRIPTION OF THE INVENTION

The solution according to the invention is particularly suitable for data transfer related to mobile mine devices required in mining, such as various moving rock drilling, loading and transportation machines. Transportation devices, in particular, often travel long distances, which requires several base stations along the route. The scope of the invention is not restricted to the remote control system for a mine vehicle described in the following, but the invention is also applicable to other kind of data transfer systems of mobile mine devices, for example to systems used in remote monitoring of mobile mine devices. Instead of the system based on the WLAN transfer technique described in the following, the invention may also be applied in systems employing a different data transfer technique.

Figure 1:
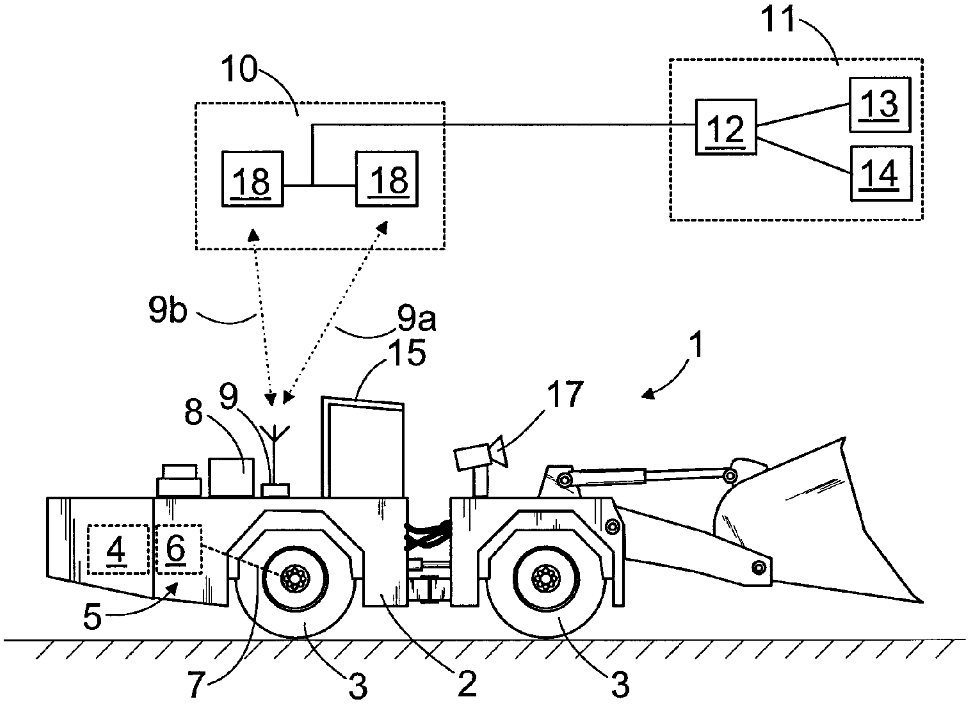
FIG. 1 illustrates a remote control system.

FIG. 1 illustrates a mine vehicle 1, which in this case is a loading vehicle whose front part is provided with a scoop for transporting or loading excavated material. Alternatively, the mine vehicle 1 may be a rock drilling rig or a transport vehicle provided with a platform, for example. The mine vehicle 1 comprises a movable chassis 2 having a plurality of wheels 3, of which at least one is a traction wheel driven by an engine 4 through power transmission 5. The power transmission 5 typically includes a gear box 6 and necessary cardan shafts 7, differentials and other power transmission means for transferring the rotation torque from the engine 4 to the traction wheels. Furthermore, the mine vehicle 1 is provided with a control system comprising at least a vehicle control device 8 arranged to control the actuators in the mine vehicle 1 for steering and using the vehicle.

The mine vehicle 1 may further comprise at least one data transfer unit 9 or a terminal for establishing at least two substantially concurrent data transfer connections 9*a*, 9*b* to a wireless network 10 provided in the mine and further to a tunneling server 12 belonging to the mine control system 11 over the wireless network 10. The network is arranged such that the different points on the mine vehicle route are principally in the coverage area of two base stations 18. The tunneling servers 12 provide tunneled connections for mine vehicles 1 and may also be located somewhere else than in connection with the control system 11. The control system 11 comprises one or more devices in particular for controlling the mine vehicle 1, such as a video display device 13 and a control server 14 that monitors the location of the vehicle 1 and gives control commands. When several mine vehicles 1 are simultaneously operating in the mine, the network 10 may be arranged to identify an identifier or a code transmitted by the mine vehicle 1, which always enables the identification of each remote-controlled mine vehicle 1. The wireless network 10 comprises several base stations 18 which communicate at least with the control system 11 but which may also communicate with one another. It should be noted that in this application the term "base station" refers to a radio unit. One physical device, which may also be called a base station in some contexts, may comprise several radio units, i.e. a single physical device may comprise several base stations illustrated in FIG. 1. Core network connections between the wireless network 10 and the mine control system 11 may be wireless or fixed. The mine control system 11 and the tunneling server 12 included therein may be located in a control room, which may be outside the mine. The control devices 8 and 14 may be computers equipped with appropriate software.

The mine vehicle 1 may be manned, in which case it comprises a control cabin 15 for an operator. The operator 16 is responsible for steering the manned mine vehicle 1, and thus no exact position is necessarily required for steering such a mine vehicle 1. On the other hand, the mine vehicle 1 may also be unmanned. An unmanned mine vehicle may be controlled by remote control from a separate control cabin based on a video image, for example, or it may be an independently controlled mine vehicle provided with a navigation system.

The mine vehicle 1 may comprise means for determining its location. The location data can be transmitted using the wireless network 10 to a device belonging to the control system 11 in the mine, such as a control server 14. Employing the location data, the mine control system 11 may monitor the movement of the mine vehicle 1 in the mine. In data transfer related to the remote control, control commands can be transmitted from the control system 11 to the vehicle 1 and at least status data can be transmitted from the vehicle 1 to the control system 11, possibly also video and/or audio data and a security signal. Thus in both directions, at least some of the data need to be transferred in as real time as possible. The mine control system 11 may be provided with a user interface 13 for manual monitoring of the operation of mine vehicles 1 in the mine. Furthermore, the mine control system 11 may maintain a register of the movements of the mine vehicles 1 in the mine, and further provide various reports and messages on monitoring results. In addition, the control system 11 may be arranged to give new work instructions to the operator of the mine vehicle on the basis of monitoring.

Figure 2:
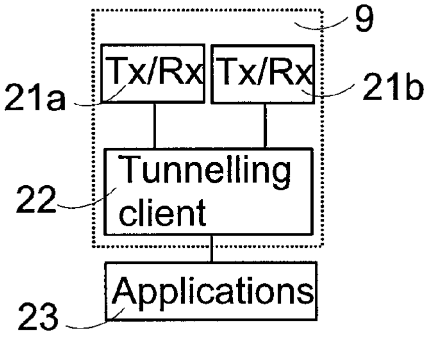
FIG. 2 illustrates a unit according to an embodiment of the invention that is responsible for data transfer.

FIG. 2 illustrates a data transfer unit 9 according to an embodiment for use in a remote-controlled machine, such as the mine vehicle 1 illustrated in FIG. 1. The data transfer unit 9 comprises two transceivers 21*a* and 21*b* for establishing substantially concurrent wireless connections 9*a*, 9*b* to different base stations 18. The components of the transceivers 21*a* and 21*b* can be implemented by ASIC circuits, for example (Application Specific Integrated Circuit). The transceiver 21*a* and 21*b* comprises a transmitter, a receiver, a synthesizer and a local oscillator for enabling frequency conversion, and a switch for selecting transmission or reception. The components of the transmitter or the receiver will not be described in greater detail since they are known to a person skilled in the art.

According to a preferred embodiment, the WLAN technique is applied in data transfer between the transceivers 21*a* and 21*b* and the base stations 18. In the present embodiment, data transfer employs IEEE 802.11 based technology but the scope of the invention is not limited to any particular radio technique. Examples of other standardized wireless local area network techniques include the Bluetooth technique, but techniques known from mobile communication networks (PLMN; Public Land Mobile Network) are also usable. For example, the fixed Ethernet technique may be employed between the wireless network 10 and the control system 11. Base stations 18 can be connected to the tunneling server 12 using a star configuration, for instance.

IEEE 802.11 specifications define both physical layer protocols and MAC layer protocols for data transfer over the radio interface. A WLAN base station (18) is also responsible for bridging of radio interface data streams or routing to the other network nodes connected thereto, which are represented by the tunneling server 12 in the example of FIG. 1. According to the IEEE 802.11 standard, the MAC layer (Medium Access Control) employs the CSMA/CA technique (Carrier Sense Multiple Access with Collision Avoidance). In radio-frequency data transfer, base stations (18) and terminal (9) transceivers (21*a*, 21*b*) may employ the direct sequence speed spectrum technique (DSSS) or frequency hopped spread spectrum technique (FHSS). In the IEEE 802.11 technique, average frequencies are spaced 20 MHz apart and transmission and reception alternate on the same frequency band, i.e. a half-duplex technique is employed. In all systems according to the IEEE 802.11 standard, transmission and reception are implemented alternately on the same frequency band, i.e. a half-duplex technique is used. An IEEE 802.11a standard employing the OFDM technique (Orthogonal Frequency Division Multiplex) has been developed for the frequency range of 5 GHz. In the OFDM technique according to the IEEE 802.11a standard, one radio channel is divided into several subcarrier waves, all of which are related to the same output. Connection establishment between the WLAN base station (18) and the transceiver (21*a*, 21*b*) can be arranged by means of prior art interception and association functions.

The data transfer unit 9 also comprises at least one control unit 22 for terminal data transfer, which controls the transceivers 21*a* and 21*b* or at least transmits tunneled packets to them/receives tunneled packets from them. According to a preferred embodiment, the control unit 22 comprises a tunneling client functionality and is arranged to transfer data from one or more applications 23, for example from the control unit of the mine vehicle 1 and from a device 17 generating video data, and to receive data for the application 23 from at least two separate tunnels. One feasible tunneling protocol will be described in greater detail below in connection with FIG. 4. According to an embodiment, tunnels are at least principally arranged, by using logical radio connections (9*a*, 9*b*), via different base stations 18. This means that tunnels can also be arranged temporarily via the same base station 18 especially when only one base station 18 is available at the current location of the vehicle 1. The data to be transmitted are transferred to both transceivers 21*a* and 21*b* after tunneling, i.e. encapsulation, in which case substantially the same data are transmitted using a wireless connection arranged via two different base stations 18. Correspondingly, the tunneling of data entities received from both transceivers 21*a* and 21*b* is removed, i.e. they are decapsulated, and the control unit 22 is arranged to transmit the received logical data entity to the application 23 only once. Thus the control 22 unit is arranged to reject the received data that have already been received through another connection.

The tunneling server 12 forming a tunnel for the tunneling client 22 comprises at least one transceiver for receiving tunneled packets from base stations 18 (or possibly from a network element between the base station 18 and the server 12) and transmit tunneled packets (addressed to the tunnel end point, i.e. to the data transfer unit 9 and particularly to the tunneling client 22) to the base stations 18. Depending on the data transfer technique to be applied, the transceiver may also be used for arranging data transfer between the tunneling server 12 and other devices, for example between devices 13 and 14. The tunneling server 12 is also arranged to transfer a data entity originating from one or more applications, for example from the application to be executed in the device 13 or 14, via at least two separate tunnels. Thus the tunneling server 12 is also arranged to provide tunnels at least principally through logical radio connections arranged via different base stations 18. After tunneling, i.e. encapsulation, the data to be transmitted are transferred to the base stations 18 in use, in which case substantially the same data are transmitted using two wireless connections. Correspondingly, the tunneling of data entities received from different base stations 18 is removed, i.e. they are decapsulated, and the tunneling server 12 is arranged to transfer the received logical data entity only once to the application defined as its destination.

The machine 1 or data transfer unit 9 where the control unit 22 illustrated in FIG. 2 can be implemented and the data processing device where the tunneling server 12 can be implemented comprise a processing unit including one or more processors. The computer program codes to be executed in the processing unit may cause the devices or units 1, 9, 12 to implement the inventive functions applied therein. Some embodiments of these functions are illustrated below in connection with FIGS. 3*a*/3*b*, 4, 5*a* and 5*b*. Hardware solutions or a combination of hardware and software solutions may also be employed to implement the inventive functions.

It should be noted that the configuration illustrated in FIGS. 1 and 2 is only one example of feasible solutions and that the utilization of two connections can also be arranged otherwise. For example, the detection of duplicates of the packets already received and/or the feeding of the data to be transmitted to at least two different connections can also be implemented in the applications 23 or in another functional entity. These functions may also be performed by a separate redundancy manager, which can be implemented by a computer program to be executed in the processor of the control unit, for instance. According to an embodiment, each transceiver 21*a* and 21*b* has a dedicated control unit. The tunneling server 12 can also be implemented as part of another network element, such as the base station 18, the device controlling the base stations 18 or the control device 13. According to an embodiment, tunnels employing several base stations 18 may also be established between different machines, for example between two different remote-controlled mine vehicles. In that case, the machine (1) may comprise a tunneling server functionality (in addition to the tunneling client functionality 22, if any) so that a tunnel can be established according to the client-server tunneling protocol.

Figure 3A:
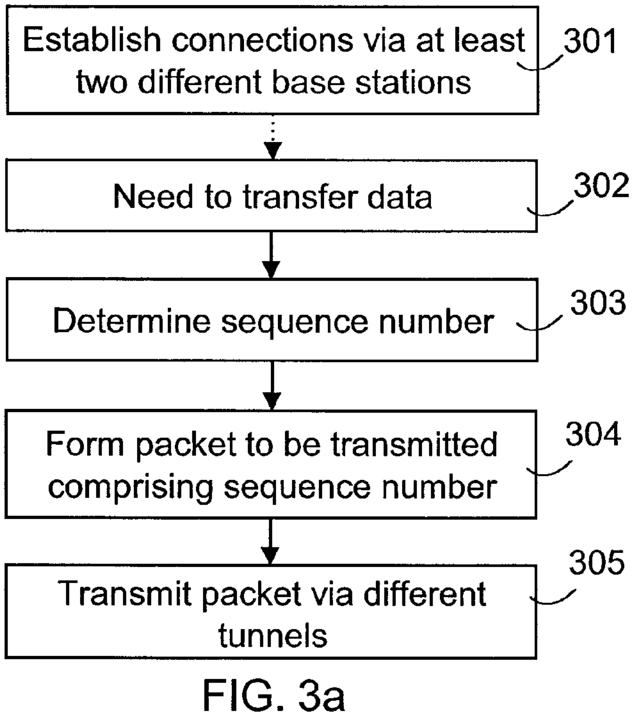
FIGS. 3*a* and 3*b* are flow charts illustrating a method according to an embodiment of the invention.

FIG. 3*a* is a flow chart illustrating a method according to a preferred embodiment according to the invention that is applicable in a device transmitting data to be tunneled, particularly in a tunneling client functionality 22 and tunneling server 12. When a tunnel is formed for tunnel end points (22, 12), the device implementing the method may in step 301 arrange logical data transfer resources via at least two different base stations 13, which means that the device participates in the establishment of connections. For example, when the method is applied in a mine vehicle 1, data transfer connections may be arranged from both transceivers 21*a* and 21*b* to the base stations 13 and further to the tunneling server 12. When step 301 is implemented in the tunneling server 12, this step may comprise establishing connections to the base stations and negotiating with the tunneling client 22 for the establishment of tunneling configurations. The connections between the base stations 18 and the transceiver 5 communicating with them can be arranged utilizing prior art connection establishment techniques; a tunneled connection may be implemented so that it is transparent to the base stations 18.

When there is a need to transmit data to one of the tunnel end points in step 302, a sequence number is determined for the data entity to be transmitted, such as an IP packet. The device applying the method according to FIG. 3*a* maintains information on the sequence numbers of the packets or other data entities to be transmitted so that each data entity to be transmitted has an identifier that distinguishes it from the other data entities. A consecutive number sequence, for example, may be employed, but other identification methods are also feasible, such as identifiers formed on the basis of the other data content of the packet. In step 304, a packet to be transmitted and having a sequence number is formed according to the tunneling protocol to be used. In that case, tunneling headers are added to the data entity functioning as payload from the tunneling protocol's point of view (e.g. an IP packet). Examples of tunneling headers are described below in connection with FIG. 4. In step 305, this tunneling packet is transmitted using at least two different In step 305, this tunneling packet is transmitted using at least two different tunnels, i.e. two different base stations.

Figure 3B:
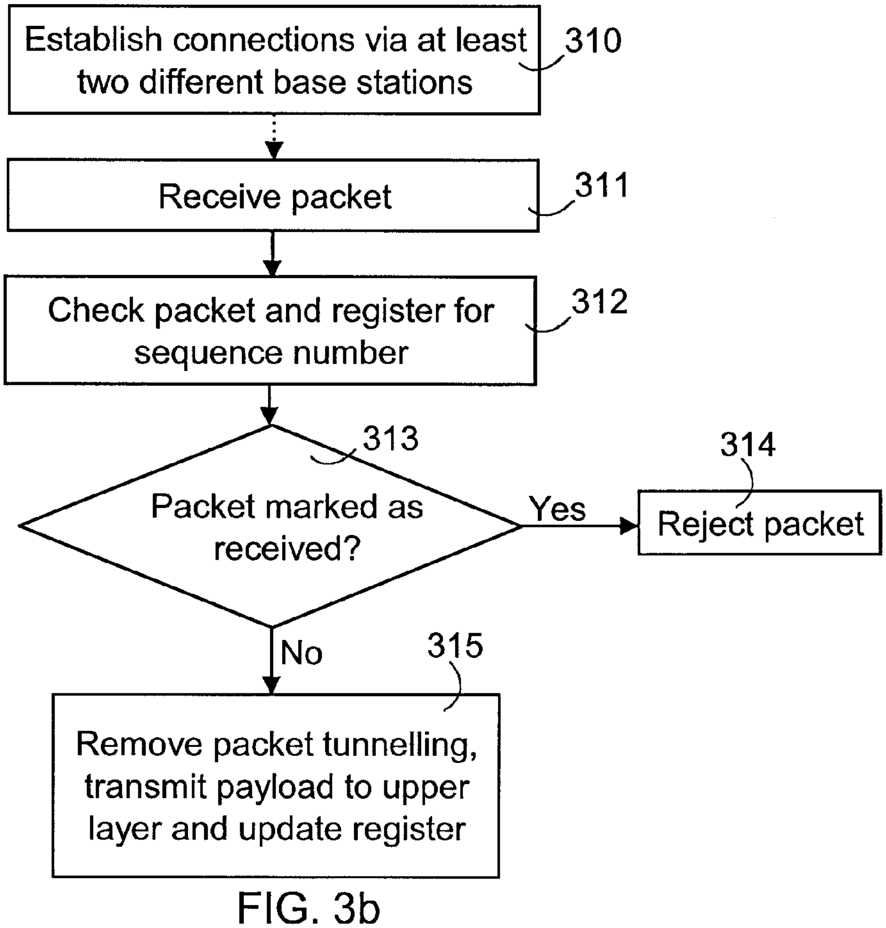

FIG. 3*b* illustrates a data transfer method according to an embodiment of the invention that is applicable in a device receiving tunneled packets, particularly in a tunneling client 22 and tunneling server 25. In a manner similar to step 301 of FIG. 3*a*, logical data transfer resources are arranged via at least two different base stations in step 310 so that at least two separate tunnels are available via different base stations. In step 311, a tunneled packet is received. The tunneling client functionality 22, for example, receives the packet from the transceiver 21*a*. The device applying the method in FIG. 3*b* maintains a register of the sequence numbers of the received packets. In that case, the received packet is checked for its sequence number in step 312, and the sequence number is also searched for in the register. If, on the basis of checking the packet and the register 312, 313, the packet has been marked as already successfully received, the packet is rejected 314. If the packet has not been marked as received, the packet tunneling can be removed in step 315, the packet payload transmitted to a higher protocol layer, and the register of sequence numbers updated with the sequence number of the packet received. The register may be an updatable list of the sequence numbers of successfully received packets but the register may also be implemented in various other ways.

According to an embodiment, only correct packets are marked as received in step 315. In that case, the defectiveness of a packet can be checked in connection with step 313 or 315 or earlier. If the packet is defective, it is not marked as received in the register (or it is not considered as a received packet at all in step 311, for example). This embodiment always allows the use of the first completely correct packet or a packet with a sufficiently good quality, and the following packets with the same content can be rejected in step 314.

A new communications protocol according to an embodiment for use in remote controlling machines will be described in the following. This protocol can be applied above the protocol layer providing data transfer, i.e. above the MAC layer of the IEEE 802.11 system in the present embodiment. The protocol is a tunneling protocol and particularly suitable for the present data transfer system requiring as short disconnections as possible in data transfer and utilizing at least two data transfer connections for remote controlling machines.

The protocol is implemented between the tunneling client implemented in the mobile machine 1, for example in the data transfer control unit 22, and the tunneling server 12 to be implemented in a device located in connection with the control system 11 according to the present embodiment. The tunneling server 12 is responsible for adding tunneling protocol header fields to the packets to be transmitted to the mobile machine 1. The tunneling client removes tunneling protocol specific header fields from the received packets and forwards the packets. Reverse functions are performed on the data to be transmitted from the machine 1.

The tunneling client 22 transmits a discovery request to a broadcasting address in step 301 or 310, for example, so that the tunneling client 22 can be configured to the tunneling server 12. The tunneling server 12 determines the client's address (e.g. the Ethernet address included in the request) and sets a logical tunnel for the client. The address of the tunneling server 12 is transmitted to the client 22, after which the logical tunnel can be completed and data transfer may begin, i.e. the method can proceed to steps 302 and 311.

Figure 4:
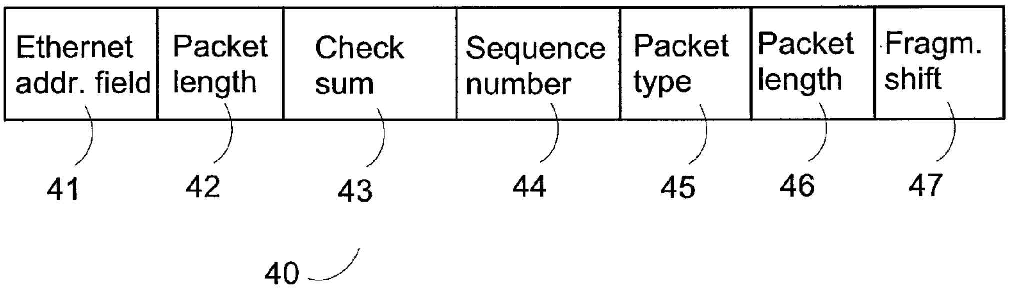
FIG. 4 illustrates header fields of a protocol according to an embodiment of the invention.

FIG. 4 illustrates header fields 40 of the packet used to transfer the payload according to a tunneling protocol according to an embodiment of the invention. FIG. 4 illustrates only the header fields of the protocol described above, which can be added to the payload or to the front of IP protocol header fields, for example, and before radio layer specific protocol header fields, such as MAC header fields of the WLAN, are added to the packet to be transmitted. An Ethernet header field portion 41 comprises an Ethernet source and destination address and the Ethernet protocol type. In addition, the header fields 40 include a field 42 indicating the packet length and a header field check sum 43, which form a protocol header field. These fields are followed by a tunneling header field comprising the packet's sequence number 44, type 45, total length 46 and fragmentation shift.

As described above, the rejection of duplicate packets resulting from the use of at least two parallel connections can be implemented on the basis of the packet sequence numbers as illustrated in FIGS. 3*a* and 3*b*. When the protocol of FIG. 4 is employed, this is carried out on the basis of the sequence number field 44.

Fragmentation may be implemented in the protocol, in which case packets exceeding the maximum length are fragmented and marked as fragmented packets. Information on the received fragments is maintained at the receiving end, and the fragments are used for reassembling the original packets before transmission to the applications 23, for instance. In that case, the maximum size of the packets of the transfer protocol below can be taken into account.

Depending on the system configuration, a TCP/IP protocol stack (Transport Control Protocol/Internet Protocol) can be used on top of the above-mentioned protocol for point-to-point transfer of application data. As appears from above, the tunneling protocol may be implemented as completely transparent in the core network (between the control system 11 and the wireless network 10).

Figure 5A:
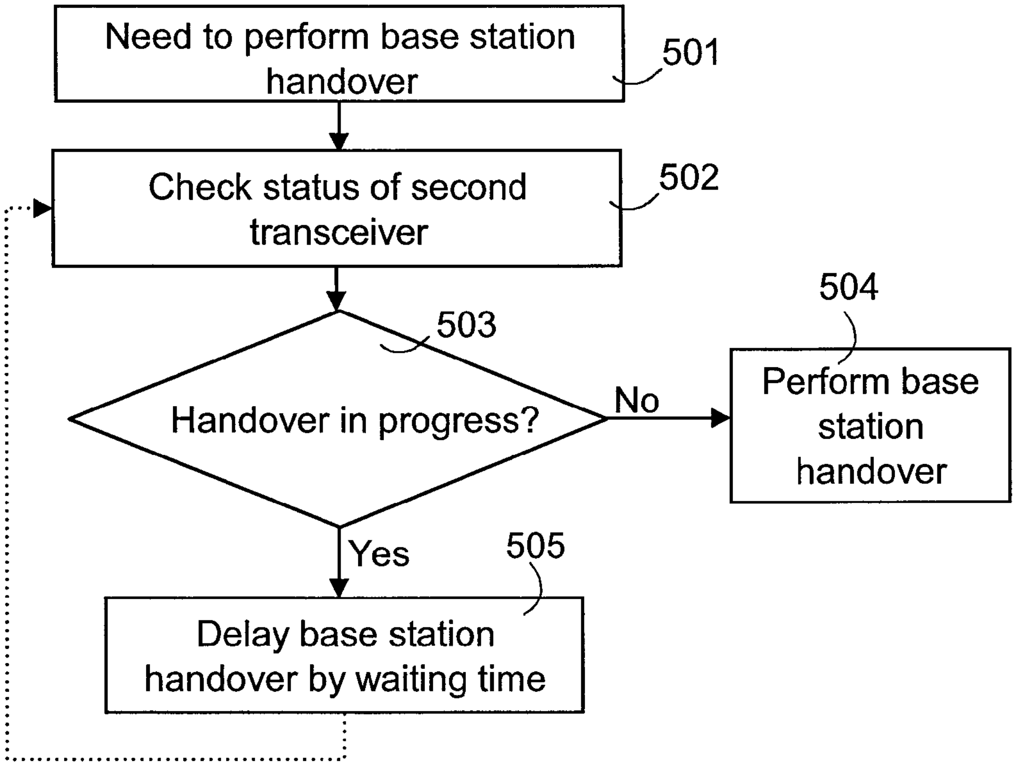
FIGS. 5*a* and 5*b* illustrate methods according to an embodiment of the invention.

In addition to the functions illustrated in FIGS. 3*a* and 3*b*, other measures for minimizing the delay may also be implemented in the device applying the method. According to a preferred embodiment, in a remote-controlled machine, such as the mine vehicle 1 of FIG. 1, and in particular in the transceivers 21*a*, 21*b* or in a separate unit controlling them, such as unit 22, base station handovers are arranged so that the base station handover is not carried out by both (or all) transceivers 21*a*, 21*b* at the same time. This is illustrated in FIG. 5*a* where there is a need to perform a handover of the base station serving the first transceiver (e.g. 21*a*) in step 501, i.e. a need to change the base station providing an active data transfer connection into another. This need typically arises when the base station handover algorithm implemented in the unit controlling the first transceiver 21*a* detects the need for handover on the basis of the signal properties of the serving base station, such as signal strength, and/or on the basis of the properties of signals received from other base station candidates. In step 502, the status of the second transceiver 21*b* is checked. In particular, it is checked 503 whether a base station handover is in progress in the second transceiver 21*b*. The unit (e.g. 22) controlling the transceivers 21*a*, 21*b* may be directly aware of this or, if the transceivers have separate control units, information may be requested from the control unit of the second transceiver 21*b* or information may be retrieved from a certain place where status information on data transfer is stored.

If no base station handover is in progress, a base station handover may be performed 504 on the first transceiver 21*a*, where prior art measures related to the transfer of a WLAN connection may be employed. If a base station handover is in progress, the base station handover to be performed on the first transceiver 21*a* is delayed in step 505. This may be implemented by waiting for a predetermined waiting period, after which the method returns to step 502, for instance.

This embodiment provides a considerable further advantage because it can be ensured that the base stations 18 are never changed at the same time, and thus the delay and any other problems arising from the base station handover can be avoided as data can always be received through at least one connection.

Figure 5B:
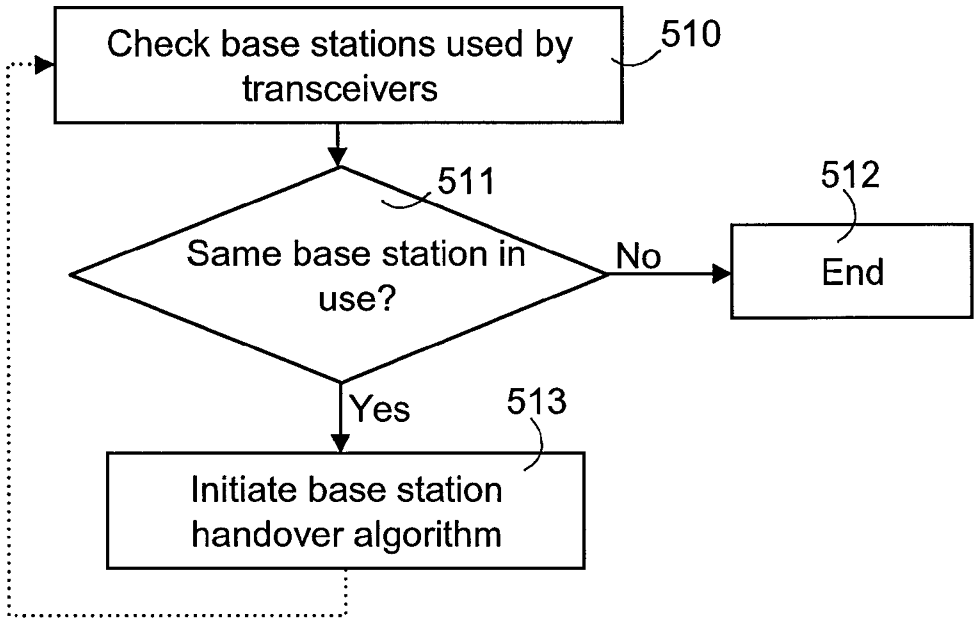

According to an embodiment illustrated in FIG. 5*b*, it can be ensured in the remote-controlled mine vehicle 1 that the transceivers 21*a*, 21*b* do not communicate with the same base stations 18. These checking measures may be performed in the unit controlling the transceivers 21*a*, 21*b*, such as the unit 22. In response to the activation criterion of the checking routine, such as the passing of a certain period from a previous check, the base stations 18 used by the transceivers 21*a* and 21*b* are checked in steps 510, 511. These data can be obtained by checking the current operation data of the transceivers 21*a* and 21*b* for WLAN base station identifiers. If the same base station 18 is in use, the algorithm for base station handover is initiated 513. This embodiment also enables ensuring that the connections use different base stations 18.

According to an embodiment, an effort is made to perform the base station 18 handover (after step 513 and/or in the algorithm for base station handover already initiated) so that a handover to a base station 18 (or the maintenance of the connection in the base station 18) having another connection is prevented or at least avoided. In that case, base station identifiers with active connections can be checked, and these base stations 18 can always be placed last in the list of base station candidates, for instance. There are also several other ways of implementing a base station handover algorithm so that base stations 18 with an existing connection can be avoided. For example, the performance of a base station handover on base station 18 of this kind may require that the signal received from it should be better by a predetermined threshold value than that of the best base station candidate 18 to which no connection has been established. Thus base stations 18 to which no connection has been established can be favoured.

According to an embodiment, base stations 18 and/or their channels have been preconfigured to the transceivers 21*a*, 21*b* so that at least partly different base stations 18 and/or channels are available for different transceivers 21*a*, 21*b*. The base stations 18 can be classified into two different service sets, such as group I and group II, by means of SSID identifiers (service set identifier), for instance. In that case, the transceiver 21*a* may be configured to listen only to the base stations of group I and to establish connections exclusively to these (including base station handover). The second transceiver 21*b* uses only the base stations of group II. This prevents the use of the same base station. The base station handover can be expedited by determining "channel lists" for the transceivers 21*a* and 21*b* so that only the available frequency domains are scanned (for example according to the classification into service groups). This embodiment also saves time during the base station handover since the number of channels to be scanned decreases.

When an embodiment described above preventing the selection of the same base station is performed, the checking routine illustrated in FIG. 5*b* does not need to be carried out, but the algorithm may take care that the connections are principally arranged via different base stations 18.

According to an embodiment, the data transfer system comprises determining the transmission order of the packets to be transmitted, which enables prioritising data used in controlling the mine vehicle 1 that requires as short a delay as possible, for example. This prioritising can be performed both in the mine vehicle 1 and in the network 10, 11, for example in the tunneling server 12. This further enhances the transfer of real-time data in the system. Non-real-time data may be provided with a lower priority, meaning that they are transferred when there are no high-priority data to be transferred. The transmission order may be determined in various ways. According to an embodiment, the priority of packets is determined on the basis of their source. For example, the data transfer control unit 22 is provided with a buffer for packets to be transmitted. Information indicating the priority of transmission may be set for different data sources, for example different applications 23, such as the application producing measurement data, the application producing video data and the application producing speech data. Priority may be set for an application producing data that require real-time transmission. The source of the packets accumulated in the buffer, for example their TCP source port, is checked and the packets received from the data source with the highest priority are transmitted first.

According to a further embodiment, the data to be prioritised are transmitted using the redundancy arrangement illustrated above that employs two tunnels. Data with no or a low priority are transmitted in the conventional manner using one connection. As stated above, when at least two parallel transfer paths are used, delays in data transfer can be minimized and these data can be prioritised compared to the rest of the traffic.

It is obvious to a person skilled in the art that as technology advances, the inventive concept can be implemented in various ways. The invention and its embodiments are thus not limited to the examples described above but may vary within the scope of the claims.

The invention claimed is:

1. A method of arranging data transfer between a mobile mine vehicle and a control point, the method comprising:

establishing at least two connections for data transfer at least from the mine vehicle, the connections being arranged via different base stations, receiving by the control point, data from the mine vehicle by using the at least the two connections, and rejecting, by the control point, received data that have already been received from the mine vehicle via one of the connections.

2. A method according to claim 1, wherein the data is tunneled over at least two different wireless connections.

3. A method according to claim 1, wherein an individual identifier is determined for data entities to be transmitted so that parallel data entities having substantially the same content have the same identifier, the identifiers of the received data entities are checked, a register of the identifiers of the received data entities is maintained, and a data entity whose identifier is already in the register is rejected.

4. A method according to claim 1, further comprising:

checking, in response to the need to perform a base station handover on a first connection, whether a base station handover is being performed on a second connection, and in response to a base station handover being performed on the second connection, delaying the performance of the base station handover on the first connection.

5. A method according to claim 1, wherein wireless connections are established using a WLAN technique (Wireless Local Area Network).

6. A system for arranging data transfer of a mobile mine vehicle, the system comprising:

at least one remote-controlled mine device, a control system for remote controlling the mine device, several base stations for arranging wireless data transfer for the mine device, means for establishing at least two connections for data transfer at least from the mine device, the connections being arranged via different base stations, means for receiving data from the mine vehicle by using at least the two connections, and means for rejecting received data that have already been received from the mine device via one of the connections.

7. A telecommunications unit for arranging data transfer for a mobile mine device, the telecommunications unit comprising a transceiver unit for arranging data transfer between at least one mine device and a network, wherein the telecommunications unit is configured to establish at least two connections for data transfer at least from the mine device, the connections being arranged via different base stations, the telecommunications unit is configured to receive data from the mine device by using at least the two connections, and the telecommunications unit is configured to reject the received data that have already been received from the mine device via one of the connections.

8. A telecommunications unit according to claim 7, wherein the telecommunications unit is configured to determine individual identifiers for the data entities to be transmitted so that parallel data entities having substantially the same content have the same identifier.

9. A telecommunications unit according to claim 7, wherein the telecommunications unit is configured to check the identifiers of the received data entities, the telecommunications unit is configured to maintain a register of the identifiers of the received data entities, and the telecommunications unit is configured to reject a data entity whose identifier is already in the register.

10. A telecommunications unit according to claim 7, wherein the telecommunications unit is configured to transmit the data to be prioritised using at least two connections established via different base stations.

11. A telecommunications unit according to claim 7, wherein the telecommunications unit is configured to determine the transmission order for the packets to be transmitted.

12. A telecommunications unit according to claim 7, wherein the telecommunications unit comprises a tunneling agent which is configured to transmit substantially the same data to at least two different tunnels and reject the data already received from the tunnels.

13. A telecommunications unit according to claim 7, wherein the telecommunications unit comprises means for arranging wireless connections using the WLAN technique (Wireless Local Area Network).

14. A telecommunications unit according to claim 7, wherein the telecommunications unit is configured to delay a handover of the first base station on the first connection in response to a base station handover being in progress on the second connection.

15. A telecommunications unit according to claim 7, wherein the telecommunications unit is configured to initiate the base station handover in response to the same base station being used at least on two connections of the mine device.

16. A telecommunications unit according to claim 7, wherein the telecommunications unit comprises a tunneling server, which is configured to transmit substantially the same data to at least two tunnels and reject the data already received from the tunnels.

17. A data processing device controlling for use in a data transfer system for a mobile mine device, wherein the data processing device comprises a telecommunications unit for arranging data transfer, the telecommunications unit comprising a transceiver unit for arranging data transfer between at least one mine device and a network, wherein the telecommunications unit is configured to establish at least two connections for data transfer at least from the mine device, the connections being arranged via different base stations, the telecommunications unit is configured to receive data from the mine device by using at least the two connections, and the telecommunications unit is configured to reject data that have already been received from the mine device via one of the connections.

* * * * *